(12) United States Patent
Martin et al.

(10) Patent No.: US 8,568,030 B2
(45) Date of Patent: Oct. 29, 2013

(54) UTILITY BAG

(76) Inventors: Kenneth Martin, San Luis Obispo, CA (US); Kelly Martine, San Luis Obispo, CA (US)

(*) Notice: Subject to any disclaimer, the term of this patent is extended or adjusted under 35 U.S.C. 154(b) by 381 days.

(21) Appl. No.: 12/896,988

(22) Filed: Oct. 4, 2010

(65) Prior Publication Data

US 2012/0082402 A1 Apr. 5, 2012

(51) Int. Cl.
*B65D 33/00* (2006.01)
*B65D 33/16* (2006.01)

(52) U.S. Cl.
USPC ............... 383/42; 383/33; 383/34; 383/63; 383/68; 224/400

(58) Field of Classification Search
USPC .......... 383/42, 48, 61.2, 63, 68, 33–34.1, 69; 224/403, 402, 539, 436, 437, 439; 150/118, 120, 121, 123, 125, 126
See application file for complete search history.

(56) References Cited

U.S. PATENT DOCUMENTS

| | | | | |
|---|---|---|---|---|
| 1,495,123 A | * | 5/1924 | Waidich | 383/22 |
| 2,083,029 A | * | 6/1937 | Lowy | 150/105 |
| 2,091,834 A | * | 8/1937 | Reiter | 24/440 |
| 2,093,276 A | * | 9/1937 | Kase et al. | 24/440 |
| 2,111,079 A | * | 3/1938 | Spear et al. | 150/106 |
| 2,223,627 A | * | 12/1940 | Landberg | 150/115 |
| 2,431,030 A | * | 11/1947 | Edwards | 383/6 |
| 2,514,750 A | * | 7/1950 | Dobbs et al. | 383/64 |
| 3,176,364 A | * | 4/1965 | Dritz | 24/304 |
| 3,464,094 A | * | 9/1969 | Mates | 24/443 |
| 5,096,107 A | | 3/1992 | VanSon | |
| 5,368,210 A | | 11/1994 | Wotring | |
| 5,378,034 A | | 1/1995 | Nelsen | |
| 6,022,144 A | * | 2/2000 | Hausslein | 383/33 |
| 6,070,775 A | | 6/2000 | Tolley et al. | |
| 6,074,094 A | * | 6/2000 | Manolizi et al. | 383/5 |
| 6,105,305 A | * | 8/2000 | Edens | 43/54.1 |
| 6,105,842 A | | 8/2000 | Cesare | |
| 6,349,865 B1 | | 2/2002 | Tolley et al. | |
| 6,401,995 B1 | | 6/2002 | Yuille et al. | |
| 6,543,659 B2 | | 4/2003 | Blair | |
| 6,572,267 B1 | * | 6/2003 | Forman | 383/61.2 |
| 6,595,568 B1 | | 7/2003 | Schroeder et al. | |
| 7,178,851 B1 | | 2/2007 | Gridley | |
| 7,458,333 B2 | | 12/2008 | Yang | |
| 7,568,566 B2 | * | 8/2009 | D'Ambrosio | 190/119 |
| 2003/0190097 A1 | * | 10/2003 | Hajianpour | 383/9 |
| 2004/0094589 A1 | | 5/2004 | Fricano | |
| 2007/0215663 A1 | * | 9/2007 | Chongson et al. | 224/930 |

OTHER PUBLICATIONS

Ultralight Nylon Tarp Bag, Downloaded from www.backcountygear.com, Sep. 15, 2010.

* cited by examiner

*Primary Examiner* — Jes F Pascua
*Assistant Examiner* — Nina Attel
(74) *Attorney, Agent, or Firm* — SoCal IP Law Group LLP; Mark A. Goldstein; Steven C. Sereboff (57) ABSTRACT

A utility bag having a closure arrangement coupled with opposing first and second panels of the utility bag. The first closure member coupled to the first panel at about an entrance of the utility bag. The first closure member includes a pair of parallel bulbous elements which form a longitudinal channel parallel to the entrance of the utility bag. A second closure member includes a third bulbous element having an interfacing surface complementary with an interfacing surface of the longitudinal channel to form an overlapping closure arrangement. Counterpart strips of hook/loop fasteners coupled to complementary interfacing surfaces associated with the first and second closure members are used to maintain the utility bag in a closed state. The bulbous elements may be formed from deformable materials disposed in sleeves which surround the entrance to the utility bag.

10 Claims, 9 Drawing Sheets

UTILITY BAG

CROSS-REFERENCE TO RELATED APPLICATIONS

Not Applicable

RELEVANT FIELD

This application is directed generally toward storage containers and more specifically toward a weather resistant utility bag.

BACKGROUND

Numerous types of bags and tarps are known in the relevant art for storing and/or transporting of objects. The bags are available in a variety of shapes, sizes and construction materials. However, bags and tarps of the relevant art tend to lack weather resistance, are time consuming to install and remove, and/or lack the ability to be properly secured within a cargo area of a vehicle. In other circumstances, the storage volumes offered and/or durability of the relevant art bags are inadequate to meet the service requirements of both commercial and residential users.

SUMMARY

In view of the foregoing, various exemplary embodiments of a weather resistant utility bag are described herein. In one exemplary embodiment, a utility bag is provided with a closure arrangement. The closure arrangement is configured such that opposing panels of the utility bag overlap when in a closed position for both weather resistance and security.

In one exemplary embodiment, the closure arrangement includes first and second closure members. The first closure member includes a pair of bulbous elements collaterally aligned in a parallel spaced relationship which peripherally borders an opening into the utility bag. The space between the two bulbous elements defines a channel which parallels the peripheral border of the bag's opening. A first hook/loop fastener strip is installed on an interfacing surface of the channel; the first hook/loop fastener is configured to receive a counterpart hook/loop fastener strip installed on an interfacing surface of the second closure member. The second closure member is aligned in a parallel spaced orientation opposite the channel and includes the counterpart hook/loop fastener strip attached to its peripheral surface. The second closure member includes a third bulbous element which is dimensioned to longitudinally fit within the channel formed by the pair of bulbous elements.

In one exemplary embodiment, the third bulbous element may be dimensioned to volumetrically fill a substantial portion of the channel when affirmatively disposed therein. In an exemplary embodiment, first and second side walls are joined with the first and second panels of the utility bag at respective opposing corners. In this exemplary embodiment each side wall is individually pivotal at about an intermediate longitudinal position between the respective first and second panels. The ability to individually pivot allows the side walls to assist in maintaining the utility bag in a generally open state during loading/unloading or to collapse between the first and second panels of the cargo to reduce the volume of the utility bag for storage. In various exemplary embodiments, affirmative placement of the third bulbous element within the channel cooperatively engages the first hook/loop fastener strip with the second hook/loop fastener strip for ensuring the utility bag remains closed.

In one exemplary embodiment, upper panels of the sidewalls above the intermediate pivoting position may include a longitudinal strip of hook/loop fasteners counterpart to the first hook/loop fastener strip. Analogously, the lower panels of the sidewalls below the intermediate pivoting position may include a longitudinal strip of hook/loop fasteners counterpart to the second hook/loop fastener strip. These features allow the sidewalls to be collapsed inward and retained within the closure arrangement, thus reducing storage volume and simplifying handling. In other various exemplary embodiments, grommets may be provided along a periphery of the first and/or second panels which allows securing of the utility bag to a vehicle or other structure. Alternately, the grommets and cords may be used to conform the utility bag to the contents contained therein.

Without the bulbous elements the large size of the utility bag combined with the flexible/limp nature of the poly tarp material would be both difficult to handle and difficult to open/close the utility bag.

BRIEF DESCRIPTION OF DRAWINGS

The features and advantages of the various exemplary embodiments will become apparent from the following detailed description when considered in conjunction with the accompanying drawings. Where possible, the same reference numerals and characters are used to denote like features, elements, components or portions of the inventive embodiments. It is intended that changes and modifications can be made to the described exemplary embodiments without departing from the true scope and spirit of the inventive embodiments described herein and as is defined by the claims.

DETAILED DESCRIPTION

Various exemplary embodiments of a weather resistant utility bag are disclosed herein. In the following detailed description, numerous specific details are set forth in order to provide a thorough understanding of the present inventive embodiments. It will be apparent, however, to one skilled in the relevant art that the present inventive embodiments may be practiced without these specific details. In other instances, well-known structures, devices or components may be shown in block diagram form in order to avoid unnecessarily obscuring the present inventive embodiments.

In one exemplary embodiment, the utility bag includes a closure arrangement coupled with opposing first and second panels of the utility bag. The closure arrangement generally includes a first closure member disposed at about an open peripheral border of the first panel. The first closure member is configured to receive a second closure member in a parallel interfacing relationship. The parallel interfacing relationship allows the first closure member to overlap the second closure member for both protection from inclement environmental conditions and also to ensure secure closure of the utility bag. In an exemplary embodiment, the second closure member is offset a predefined distance inwardly from an open peripheral border of the first panel which allows the first closure member to overlap the second closure member. The first and second closure members are securely fastened together with counterpart strips of hook/loop fasteners coupled to their interfacing surfaces. In one exemplary embodiment, sidewall projections extending laterally from the first and second closure members of the utility bag may be folded rearward which parallel the sidewalls and are then cinched into position by cords or ropes.

Figure 1:
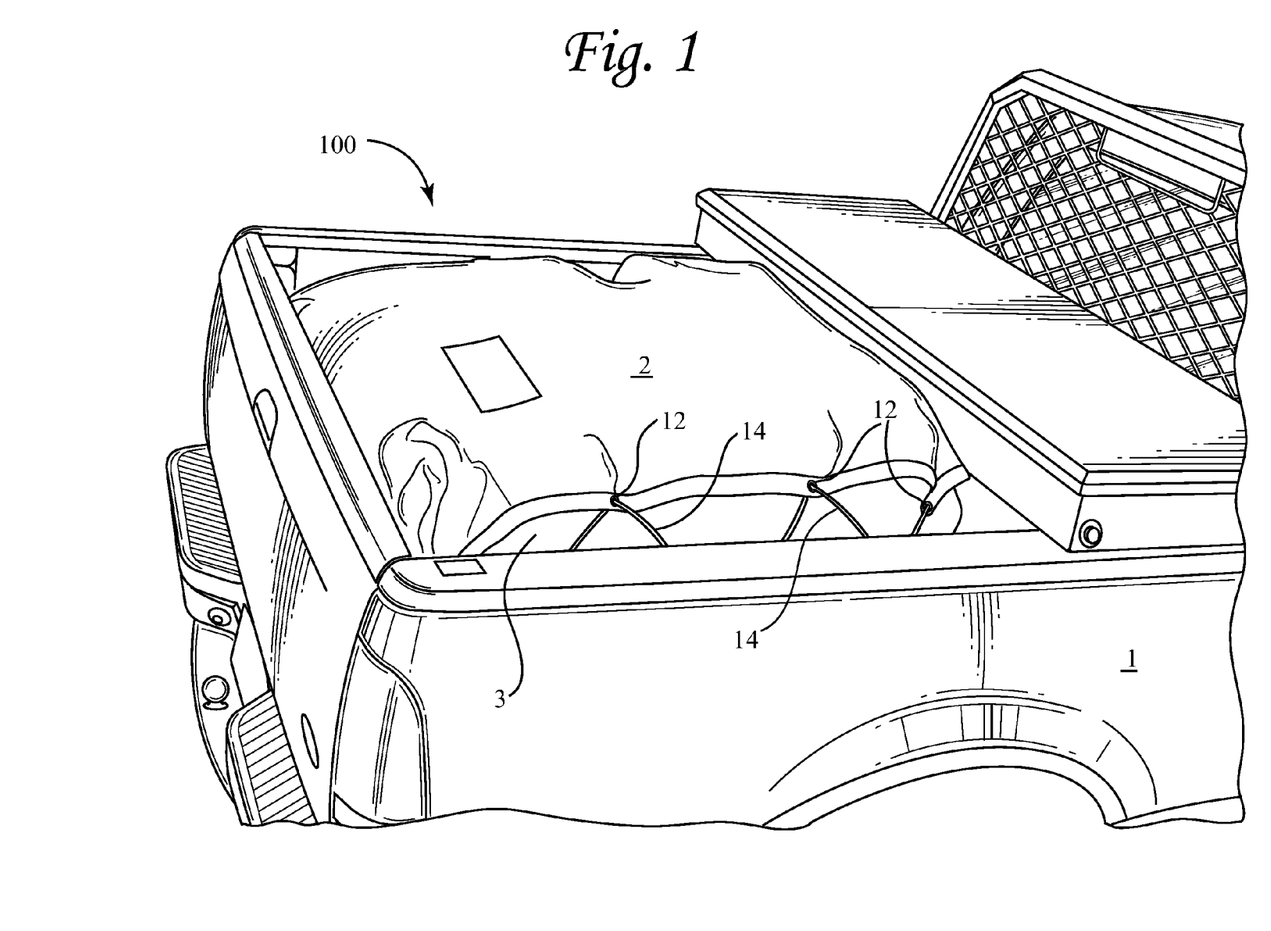
FIG. 1—depicts a side perspective view of a utility bag in accordance with an exemplary embodiment.

Referring to FIG. 1, a perspective view of a utility bag 100 in accordance with an exemplary embodiment is depicted. In an exemplary embodiment, the utility bag 100 may be dimensioned to fit within a cargo area of a vehicle 1. One skilled in the relevant art will appreciate that other dimensions may be provided to achieve a particular design objective. Grommets 12 may be provided in at least a first panel 2 of the utility bag 100. The grommets 12 may be used to receive a cord or rope 14 therethrough to secure the utility bag 100 to the vehicle 1 and/or to conform the first panel with the second panel 4 when cargo is contained therein. The utility bag 100 may be used without attachment of the cord 14 to the vehicle. The utility bag 100 may be constructed from a wide variety of commonly available sheet materials. By way of example and not limitation, polyethylene, silicone or nylon laminated mesh, treated canvas, Tyvek® and like materials. In a preferred embodiment, the utility bag 100 is constructed from one or more sheets of poly tarp material having ultraviolet protective properties included therein. The number of sheets of poly tarp material is generally dependent on the desired dimensions of the utility bag 100.

Likewise the thickness of the construction materials is generally dependent on the desired durability of the utility bag 100. Typical thicknesses of 5 to 25 mils should suffice for most commonly encountered implementations. The sheet material from which the utility bag 100 is constructed should preferably include waterproof or water resistant properties to protect cargo 95 (FIG. 2B) stored in the utility bag 100 from inclement environmental conditions. In one exemplary embodiment, battens may be incorporated into either or both the first and second panels 2, 4 to maintain an aerodynamic cross section when transporting the utility bag 100 in open environment (e.g., pickup truck bed.) The battens may be formed from foam, plastic, PVC or other material encased in sleeves and aligned parallel to the closure arrangement 200 (not shown). Alternately, or in conjunction therewith, bungee cords may be incorporated into or made attachable to the either or both the first and second panels 2, 4 to reduce the volume of the utility bag 100 (not shown).

Figure 2A:
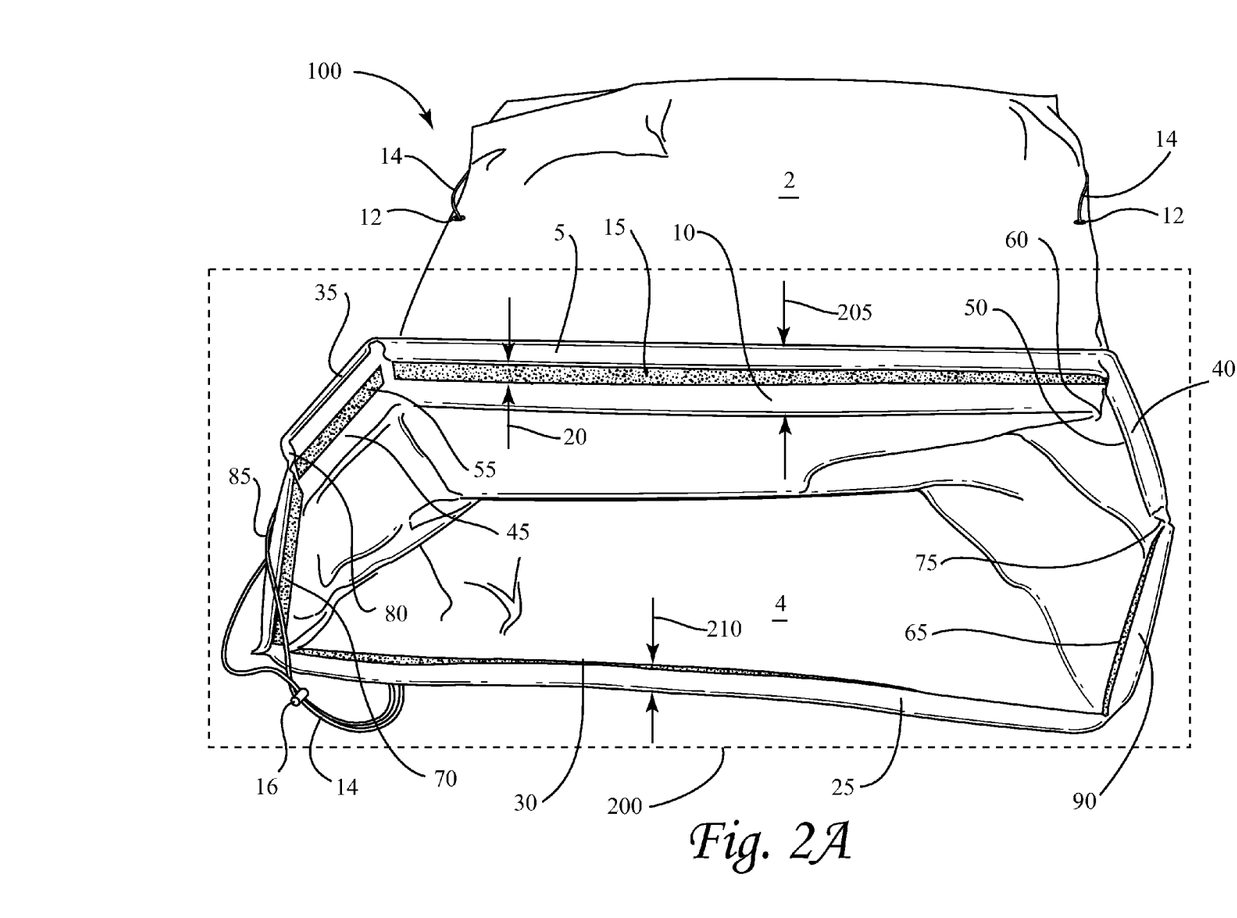
FIG. 2A—depicts a first detailed frontal view of a utility bag in accordance with an exemplary embodiment.

FIG. 2A depicts a first detailed frontal view of a utility bag 100 in accordance with an exemplary embodiment. In this exemplary embodiment, details of a closure arrangement 200 for the utility bag 100 are disclosed. The closure arrangement 200 includes first and second closure members 205, 210. The first closure member 205 includes a pair of bulbous elements 5, 10 aligned in a parallel spaced relationship with one another which peripherally borders an open end of the utility bag 100. The first closure member 205 is coupled to the first panel 2 of the sheet material from which the utility bag 100 is constructed at the entrance into the utility bag 100. The parallel relationship between the opposing walls of the first and second bulbous elements 5, 10 forms a channel 20. The channel 20 is dimensioned to longitudinally receive a third bulbous element 25. The channel 20 includes a first hook/loop fastener strip 15 upon an interfacing surface which substantially spans a long dimension of the channel 20 between the opposing walls of the pair of bulbous elements 5, 10.

The second closure member 210 includes the third bulbous element 25 coupled to the second panel 4 of the sheet material from which the utility bag 100 is constructed. The third bulbous element 25 is aligned in a parallel spaced orientation opposite the channel 20. The second closure member includes a second hook/loop fastener strip 30 that is counterpart with the first hook/loop fastener strip 15 installed on the interfacing surface of the channel 20. The affirmative placement of the third bulbous element 25 within the channel 20 cooperatively engages the first hook/loop fastener strip 15 with the second hook/loop fastener strip 30 which ensures that the utility bag 100 is maintained in a closed state. When closed, the first closure member 205 overlaps the second closure member 210 to provide a weather resistant seal.

In an exemplary embodiment, the bulbous elements 5, 10, 25 are formed from deformable materials which may be enclosed in sleeves 405 (FIGS. 4A-4C) provided with the first and second closure members 205, 210. The sleeves 405 substantially surround an open end of the utility bag. The bulbous elements 5, 10, 25 may be constructed from polymeric foam, a cloth fabric, polymeric beads, sponge material and polymeric tubing. The bulbous elements 5, 10, 25 should include sufficient rigidity to maintain the first and second closure members 205, 210 in a generally parallel orientation on the opposing panels 2, 4 joined to the closure arrangement 200. One skilled in the relevant art will appreciate that other suitable construction materials may be used for the bulbous elements 5, 10, 25.

Figure 6:
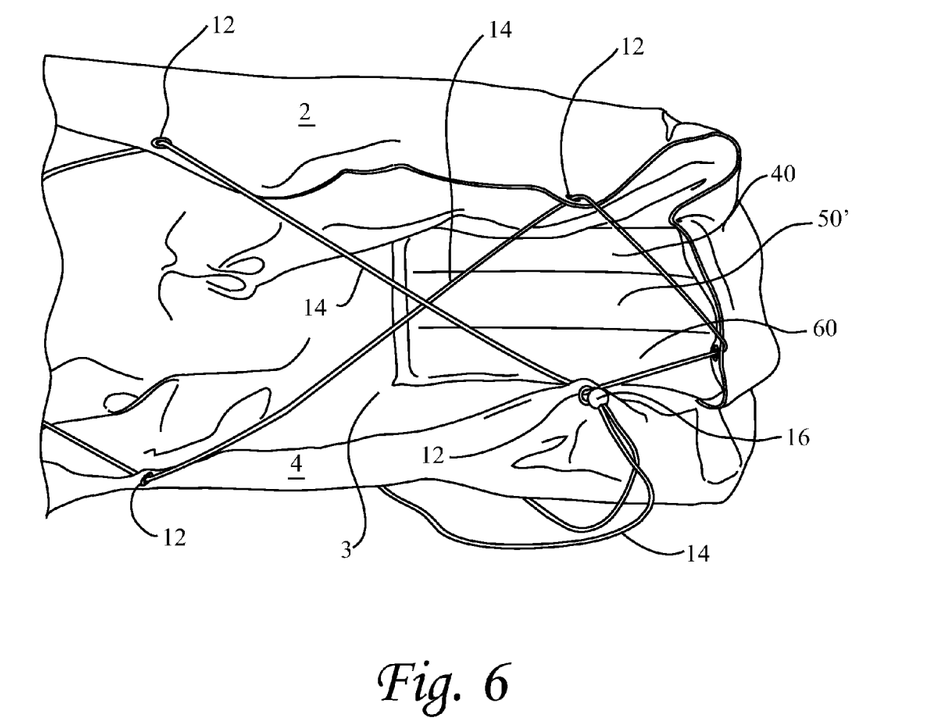
FIG. 6—depicts a side view of a closure arrangement for a utility bag in accordance with an exemplary embodiment.

In an exemplary embodiment, first 35, 85 and second repositionable side walls 40, 90 are joined with the first 2 and second 4 panels at opposing respective corners. The first 35, 85 and second side walls 40, 90 are individually pivotal 75, 80 at about an intermediate positions 75, 80 between the respective first 2 and second panels 4. Upper sections 35, 40 of the first 35, 85 and second sidewalls 40, 90 superjacent to the intermediate positions 75, 80 include longitudinal strips of hook/loop fasteners 50, 55 counterpart to the first hook/loop fastener strip 15. Analogously, lower sections 85, 90 of the first 35, 85 and second sidewalls 40, 90 subjacent to the intermediate positions 75, 80 include longitudinal strips of hook/loop fasteners 65, 70 counterpart to the second hook/loop fastener strip 30. The counterpart arrangements of the hook/loop fastener strips 50, 55, 65, 70 allow the first 35, 85 and second sidewalls 40, 90 to fold inward as shown in FIG. 2C or rearward as shown in FIG. 6.

The first 35, 85 and second side walls 40, 90 are configured to at least assist in maintain the utility bag 100 in a generally open state during loading or to collapse inward at the individually pivotal 75, 80 positions to reduce the volume of the utility bag 100 for storage. Additional support to maintain the closure arrangement 200 in an open state may be provided using the cords 14 disposed on opposing sides of the utility bag 100.

Figure 2B:
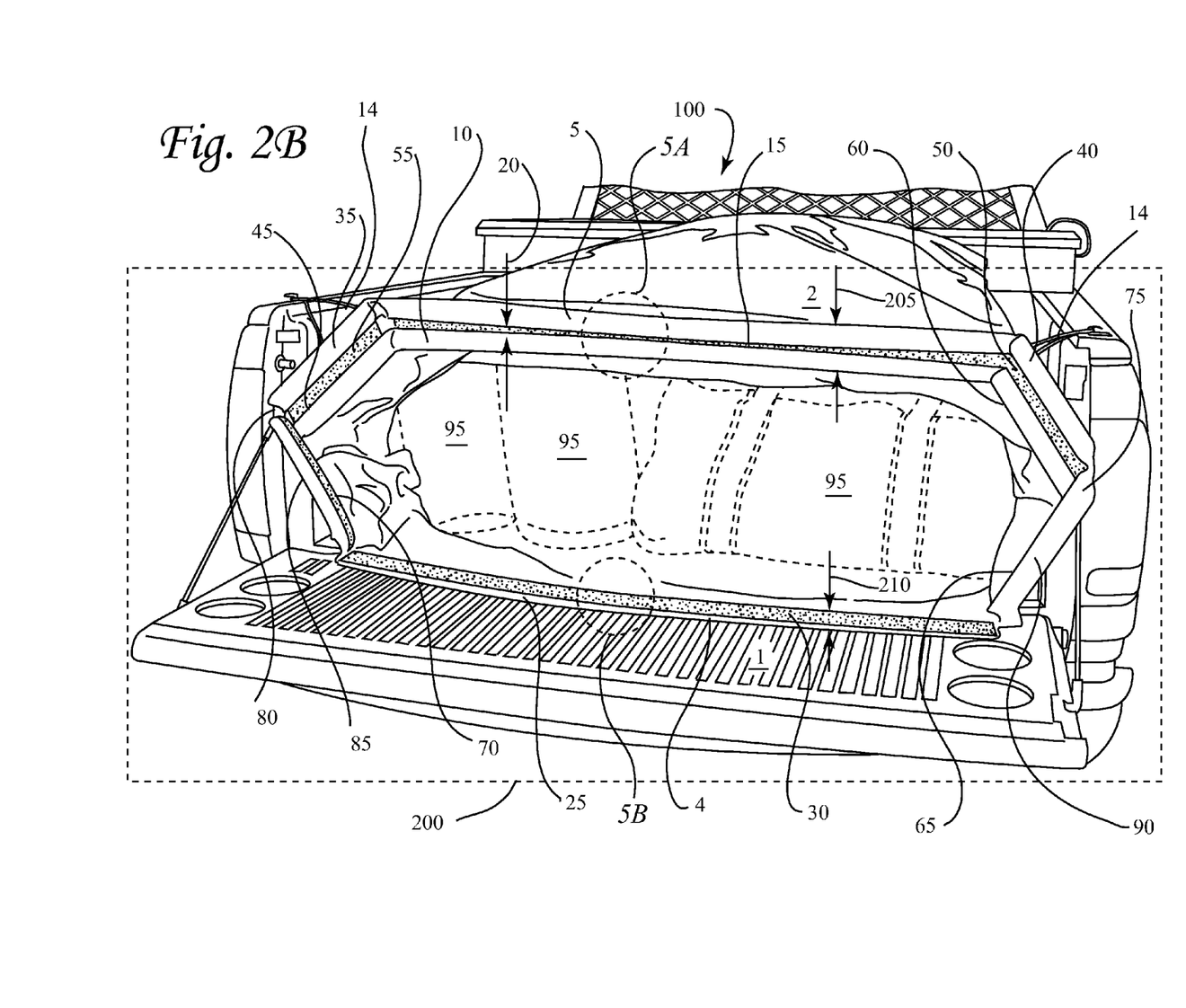
FIG. 2B—depicts a second detailed frontal view of a utility bag in accordance with an exemplary embodiment.

Referring to FIG. 2B, a second detailed frontal view of a utility bag 100 in accordance with an exemplary embodiment is depicted. In this exemplary embodiment, the closure arrangement 200 is depicted in an open position with cargo 95 contained within the interior volume of the utility bag 100. The side walls 35, 80, 40, 90 in conjunction with retention cords 14 attached to the vehicle 1 facilitates the closure arrangement 200 to remain in an open state with the first and second closure member 205, 210 aligned in a generally parallel spaced relationship. Without the bulbous elements 5, 10, 25, a large sized utility bag 100 combined with the flexible/limp nature of the poly tarp material would be both difficult to handle and difficult to open/close the utility bag 100. Detailed views of the closure arrangement 200 depicting the pair of bulbous elements 5, 10 and third bulbous element 25 are provided in FIGS. 5A and 5B.

Figure 2C:
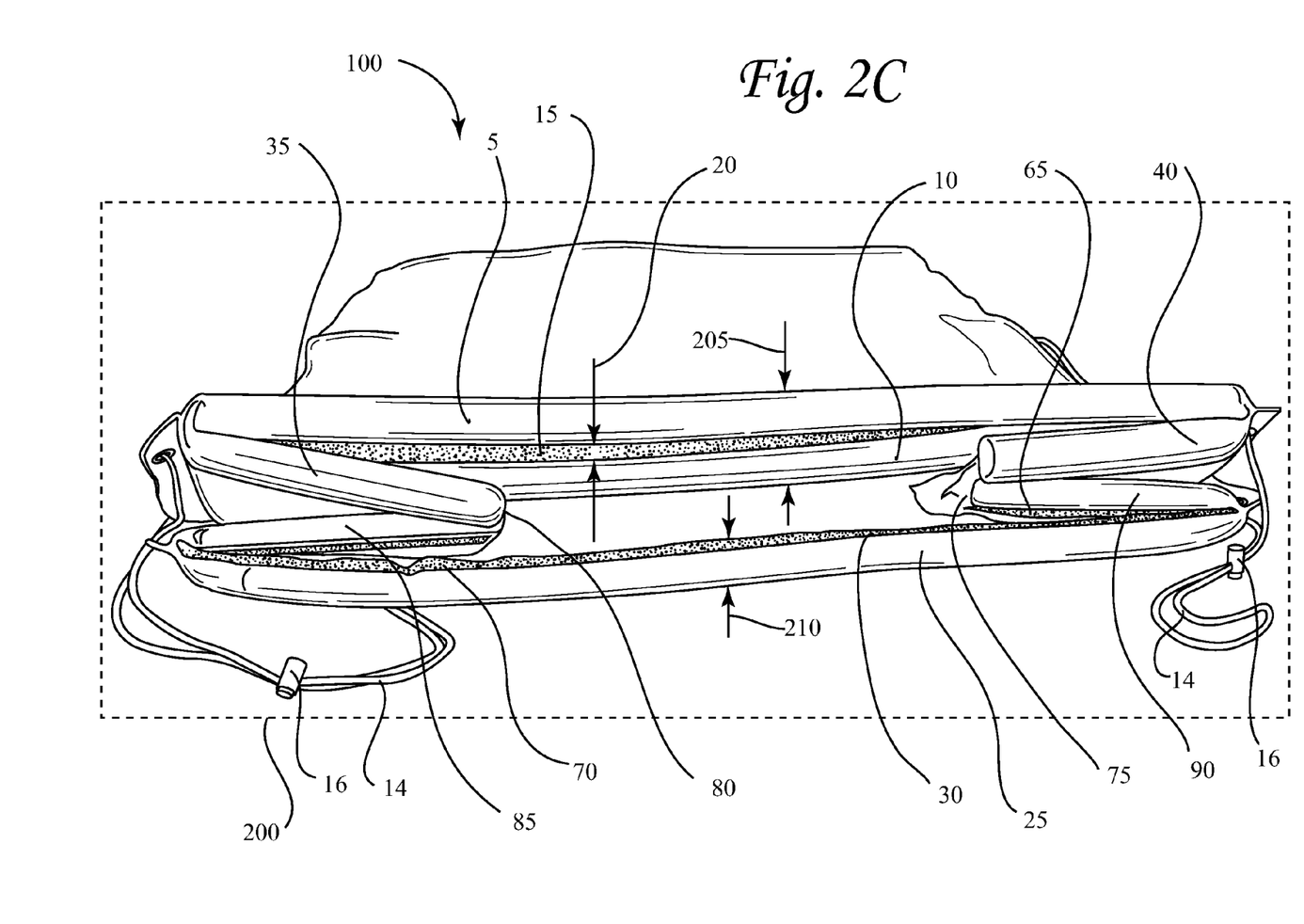
FIG. 2C—depicts a third detailed frontal view of a utility bag in accordance with an exemplary embodiment.

Referring to FIG. 2C, a third detailed frontal view of a utility bag 100 in accordance with an exemplary embodiment is depicted. In this exemplary embodiment, the utility bag 100 is depicted in a storage configuration with the side walls 35, 85, 40, 90 folded inward at the individual pivotal 75, 80 locations between the first and second closure members 205, 210. This conformation may be used to minimize storage volume of the utility bag 100 or in situations where environmental concerns are not at issue.

As discussed above, the hook/loop fasteners 65, 70 attached to the sidewalls 35, 85, 40, 90 are complementary to the hook/loop fasteners 15, 30 of the first and second closure members 5, 10, 25. This allows the closure arrangement 200 to affirmatively remain in a reduced volume for storage purposes. Cord stops 16 may be provided on opposing sides of the utility bag 100 which allows the cords 14 to be tightened or loosened during use to accommodate changes in cargo or conformation of the utility bag 100.

Figure 3:
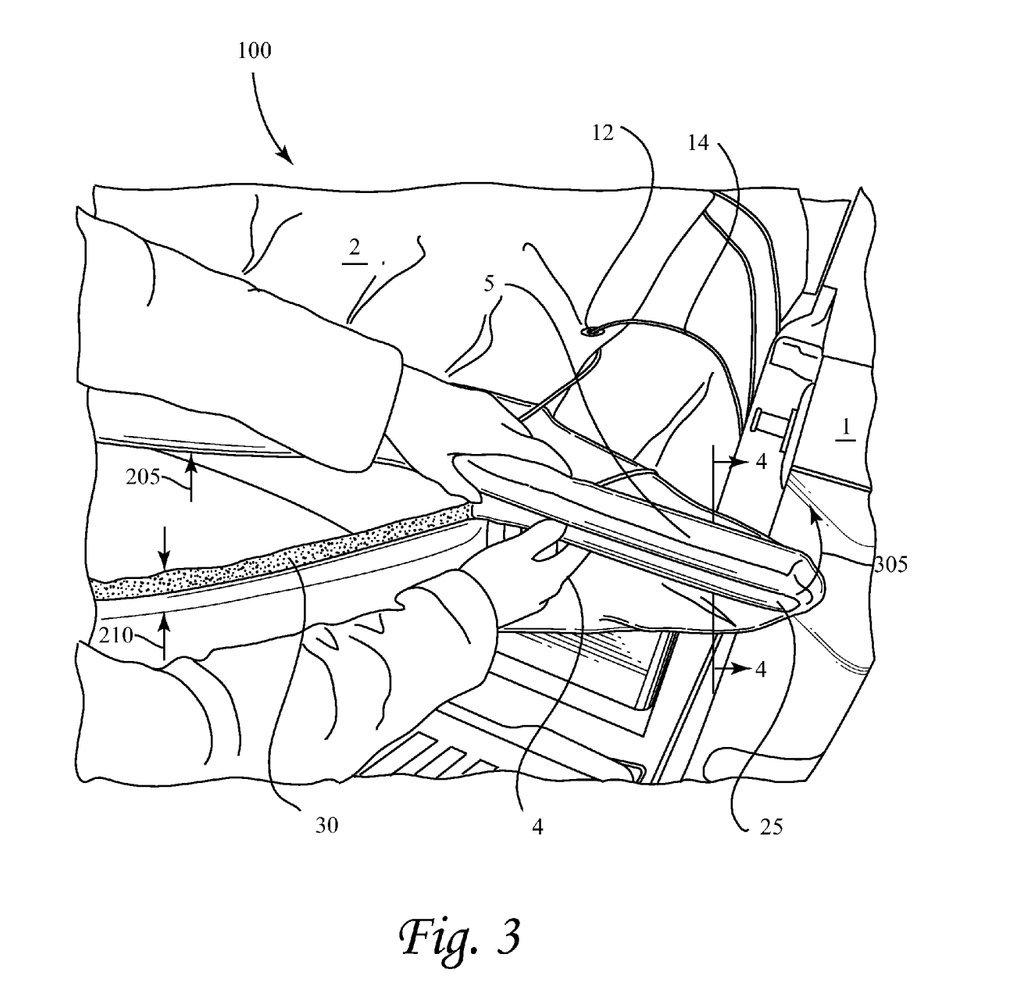
FIG. 3—depicts a perspective view of a closure arrangement for a cargo in accordance with an exemplary embodiment.
Figure 7:
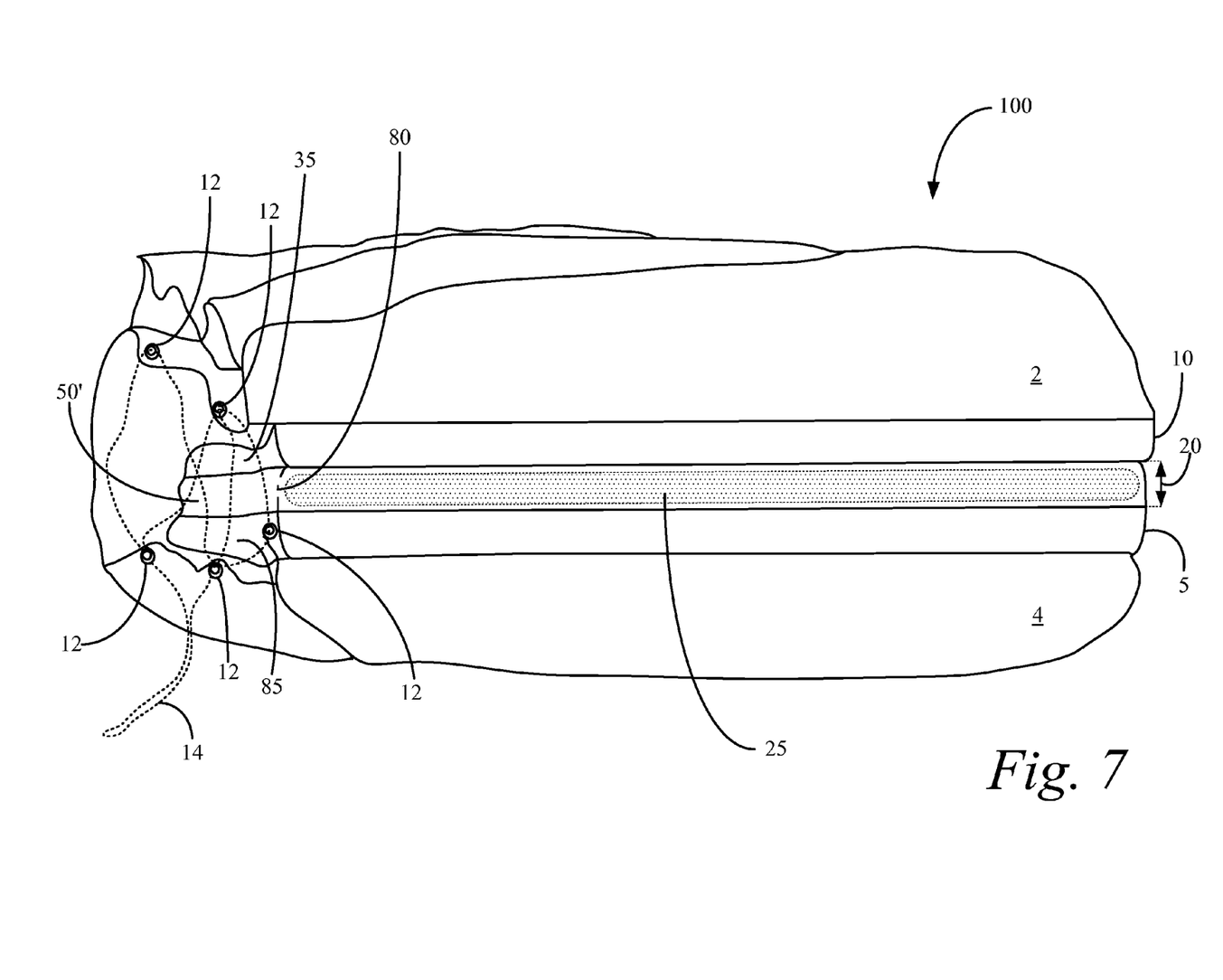
FIG. 7—depicts a frontal perspective view of a closure arrangement for a utility bag in accordance with an exemplary embodiment.

Referring to FIG. 3, a perspective view of a closure arrangement 200 for a utility bag 100 in accordance with an exemplary embodiment is depicted. In this exemplary embodiment, a user is shown manipulating the first and second closure members 205, 210 in order to seal the utility bag 100. This operation is a simple one, performed by simply aligning the first and second closure members 205, 210 in a parallel relationship and subsequently pressing together the two closure members 205, 210 such that the hook/loop fasteners 15, 30 engage within the channel 20 of the first closure member 205. The projecting sidewalls may then be rotated rearward 305 and secured under the cords 14 as is depicted in FIG. 7. For maximum protection from environmental hazards, the first panel 2 should be oriented as the top.

Figure 4A:
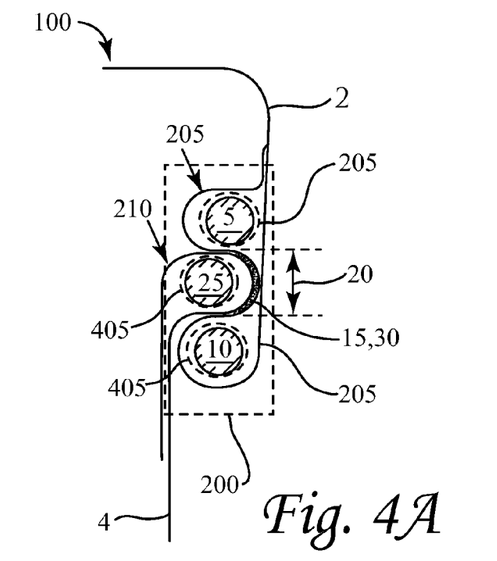
FIG. 4A-D—depicts various cross-sectional views of closure arrangements for a utility bag in accordance with an exemplary embodiment.

Referring to FIGS. 4A-4D, cross-sectional views of various embodiments of the closure arrangement 200 is depicted. In FIG. 4A, a first closure member 205 is depicted which includes the pair of bulbous elements 5, 10. The second closure member 210 includes the third bulbous element 25 which is pressed into the channel 20 formed between sleeves 405 housing the parallel bulbous elements 5, 10. In this exemplary embodiment, the bulbous elements 5, 10, 25 are constructed from cylindrical foam elements. The various interfacing surfaces of the first 205 and second closure members 210 include complementary hook/loop fastener strips 15, 30 which interlock the first and second closure members 205, 210 together when the utility bag 100 is closed. In an exemplary embodiment, the bulbous elements 5, 10, 25 are constructed from both compressible and deformable materials which allows volumetric filling of the channel 20 with the bulbous element 25 of the second closure member 210.

Figure 4B:
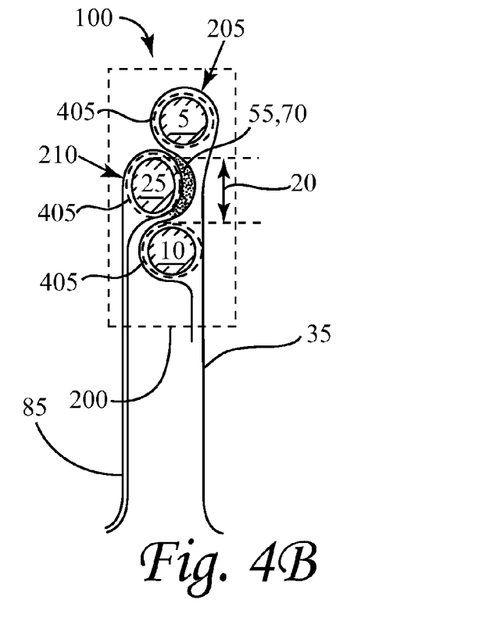
Figure 4C:
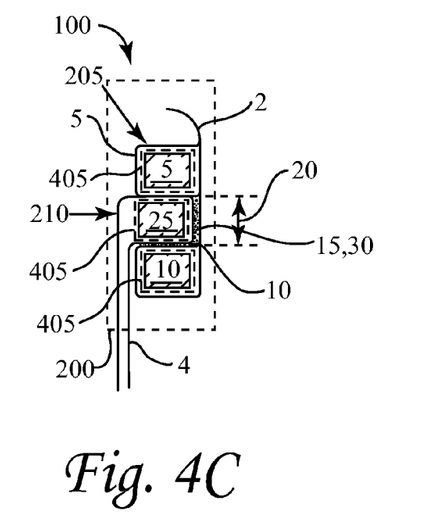

In FIG. 4B, in exemplary embodiments where sidewalls 35, 85, 40, 90 (FIG. 2B) are employed (generally with larger volume utility bags 100), the closure arrangement 200 is depicted analogous to FIG. 4A where complementary sidewall members 35, 85 are coupled together with hook/loop fasteners 55, 70. In FIG. 4C, an alternate exemplary embodiment of the closure arrangement 200 is depicted in which the shapes of the interlocking bulbous elements 5, 10, 25 are made rectangular or square rather than cylindrical. The actual shape of the bulbous elements 5, 10, 25 is not at all critical to the various implementations described herein. Preferably, the first closure member 205 associated with the first panel 2 should overlap the second closure member 210 associated with the second panel 4 along with intercalating bulbous elements 5, 10, 25 which interlock with complementary hook/loop fasteners 55, 70.

Figure 4D:
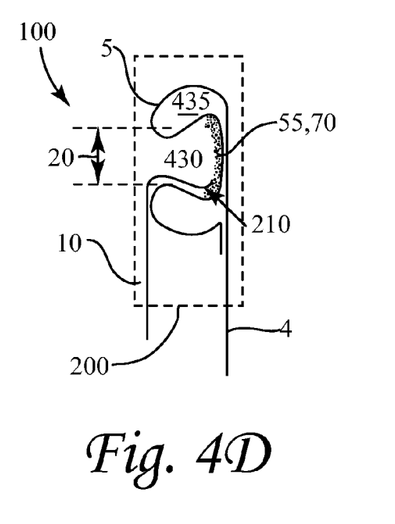

In FIG. 4D, another exemplary embodiment is depicted where the first closure member 5 is configured as a socket which complements the contour of the second closure element 10 in a type of ball 430 and sockets 435 arrangements. As before, the two complementary first and second closure members 205, 210 are interlocked with complementary hook/loop fasteners 55, 70. In this exemplary embodiment, either or both the ball and socket are constructed from a deformable material. One skilled in the relevant art will appreciate that the construction materials for this exemplary embodiment may be varied to include high impact plastics and other polymeric materials.

Figure 5A:
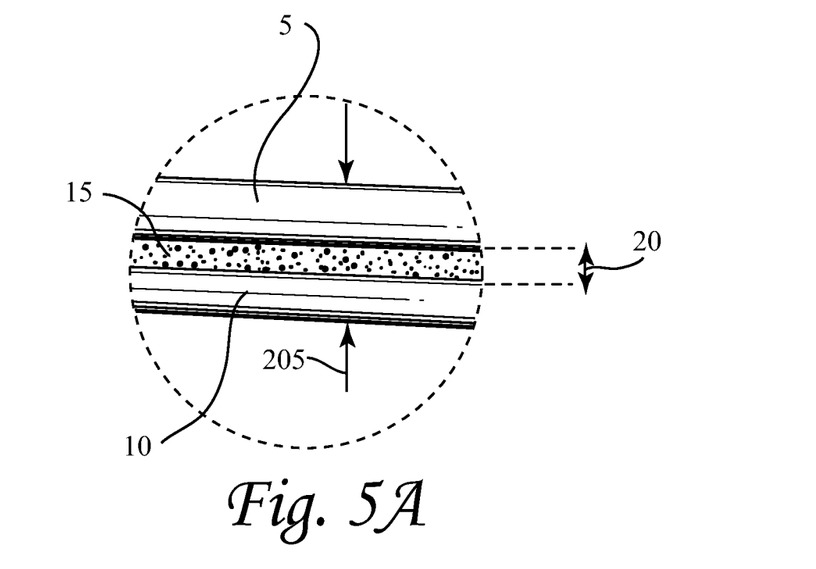
FIG. 5A,B—depicts various detailed views of certain aspects of a closure arrangement for a utility bag in accordance with an exemplary embodiment.
Figure 5B:
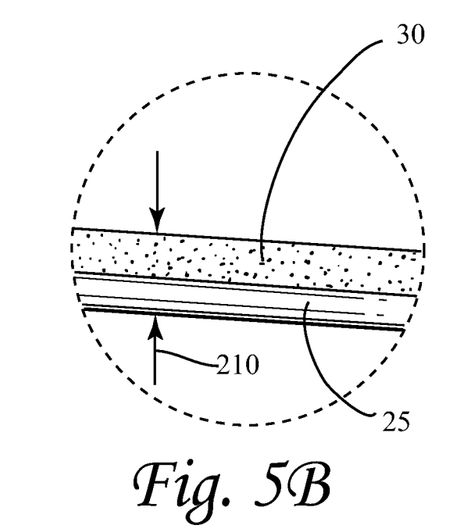

Referring to FIGS. 5A,B various detailed views of certain aspects of the closure arrangement 200 for a utility bag 100 in accordance with an exemplary embodiment are depicted. In these exemplary embodiments, the pair of bulbous elements 5, 10 of the first closure member 205 is shown in a parallel spaced relationship which forms a longitudinal channel 20 therebetween. A first strip of hook/loop fastener 15 is longitudinally disposed in the channel 20. The channel 20 is dimensioned to receive the third bulbous element 25 associated with the second closure member 210. The third bulbous element 25 includes a counterpart hook/loop fastener strip 30 attached to a mating surface which interfaces with the first hook/loop fastener strip 30. Depending on the materials in which the bulbous elements 5, 10, 25 are constructed, a deformable compression fit of the third bulbous element 25 between pair of bulbous elements 5, 10 may be provided. This arrangement allows the third bulbous element 25 to volumetrically fill a substantial portion of the channel 20 when disposed therein.

Referring to FIG. 6, a side view of the closure arrangement 200 for a utility bag 100 in accordance with an exemplary embodiment. In this exemplary embodiment, a projecting sidewall 40, 50', 60 is shown being cinched between cords 14. This arrangement provides a compact configuration of the utility bag 100 and also affirmatively seals the closure arrangement 200 from environmental hazards.

The flexible nature of the utility bag's construction material and placement of the individually pivotal 75, 80 positions allows the projecting sidewall 40, 50', 60 to be positioned rearward to be captured within a web formed by the cords 14 on a side 3 of the utility bag 100. Once the projecting sidewall 40, 50', 60 has been captured by the cords 14, the cord stop may be used to affirmatively secure the projecting sidewall 40, 50', 60 into position. While not shown, a mirror image of the projecting sidewall 40, 50', 60 may be provided on an opposing side of the utility bag 100 and secured analogously.

Referring to FIG. 7, a frontal perspective view of a closure arrangement for a utility bag in accordance with an exemplary embodiment is depicted. In this exemplary embodiment, the utility bag 100 is shown in a closed state. The closed state is typical of when the utility bag 100 is used to contain cargo 95 (FIG. 2B). As discussed above, the pair of bulbous elements 5, 10 are shown in a parallel spaced relationship which forms the longitudinal channel 20 there between. The channel 20 receives the third bulbous element 25 between the pair of bulbous elements 5, 10 in an overlapping relationship which provides protection against precipitation and other environmental hazards.

The third bulbous element 25 is depicted in shaded and dashed lines to illustrate its placement beneath the material which lines the channel 20. As also discussed above, the first strip of hook/loop fastener 15 is longitudinally disposed in the channel 20 (FIGS. 5A, 5B) which is configured to receive the counterpart hook/loop fastener strip 30 attached to an interfacing surface of the third bulbous element 25. The cord(s) 14 are shown in dotted lines so as to not obscure the details of how the projecting sidewall 40, 50', 60 are aligned in juxtaposition to a side of the utility bag 100.

The various exemplary inventive embodiments described herein are intended to be merely illustrative of the principles underlying the inventive concept. It is therefore contemplated that various modifications of the disclosed embodiments will without departing from the inventive spirit and scope be apparent to persons of ordinary skill in the art. They are not intended to limit the various exemplary inventive embodiments to any precise form described. In particular, it is contemplated that utility bag may be constructed from any suitable material with different dimensions and/or cross-sectional profiles. No specific limitation is intended to a particular construction material(s), assembly order, shape or sequence described. Other variations and inventive embodiments are possible in light of the above teachings, and it is not intended that the inventive scope be limited by this specification, but rather by the Claims following herein.

What is claimed:

1. A utility bag dimensioned to fit within a vehicular cargo area, the utility bag comprising:
    a closure arrangement coupled with opposing first and second panels of the utility bag, the closure arrangement comprising:
        a first closure member coupled to the first panel at about an entrance of the utility bag, the first closure member including a pair of parallel bulbous elements forming a longitudinal channel which parallels the entrance of the utility bag, wherein each of the bulbous elements include a cylindrical element,
        a second closure member coupled to the second panel and offset a predefined distance inwardly from the entrance of the utility bag, the second closure member including a third bulbous element having an interfacing surface complementary with an interfacing surface of the longitudinal channel, wherein the third bulbous element includes a third cylindrical element,
        counterpart strips of hook and loop fasteners coupled to the complementary interfacing surfaces associated with the first and second closure members for maintaining the utility bag in a closed state;
    first and second side walls joined with the first and second panels at respective opposing corners, wherein each of the first and second side walls include first and second cylindrical elements separated from each other at an intermediate position between the respective first and second panels to allow each side wall to be individually pivotal at the intermediate position and to assist in maintaining the utility bag in a generally open state during loading and to collapse and fold inward at the intermediate position for reducing the volume of the utility bag for storage when empty;
    the closure arrangement configured wherein placement of the third bulbous element within the channel cooperatively engages the hook and loop fastener strips for ensuring the bag is maintained in a closed state.

2. The utility bag of claim 1 wherein the bulbous elements are formed from sleeves filled with the cylindrical elements, and the sleeves substantially surround the entrance of the utility bag.

3. The utility bag of claim 2 wherein the sleeves are formed into the first and second panels.

4. The utility bag of claim 1 wherein the cylindrical elements are constructed of a material selected from the group consisting of: a polymeric foam, sponge material and polymeric tubing.

5. The utility bag of claim 1 wherein the first closure member overlaps the second closure member to form a weather resistant seam.

6. The utility bag of claim 1 wherein the third bulbous element is dimensioned to volumetrically fill a substantial portion of the channel when disposed therein.

7. The utility bag of claim 1 wherein the first and second panels are contiguous.

8. The utility bag of claim 1 wherein the first closure member overlaps the second closure member when the utility bag is closed.

9. The utility bag of claim 1 wherein the utility bag is constructed from a substantially weather resistant fabric.

10. The utility bag of claim 1 wherein at least the first panel includes a plurality of grommets disposed about an outer periphery thereof for cinch contents contained in the utility bag.

* * * * *

UNITED STATES PATENT AND TRADEMARK OFFICE
CERTIFICATE OF CORRECTION

| | | |
|---|---|---|
| PATENT NO. | : 8,568,030 B2 | Page 1 of 1 |
| APPLICATION NO. | : 12/896988 | |
| DATED | : October 29, 2013 | |
| INVENTOR(S) | : Martin et al. | |

It is certified that error appears in the above-identified patent and that said Letters Patent is hereby corrected as shown below:

Title page, item (76), replace Inventor name "Kelly Martine" with --Kelly Martin--

Signed and Sealed this
Fifteenth Day of April, 2014

Michelle K. Lee
*Deputy Director of the United States Patent and Trademark Office*